US012278429B2

(12) United States Patent
Kaufmann

(10) Patent No.: US 12,278,429 B2
(45) Date of Patent: Apr. 15, 2025

(54) ANTENNA COMPRISING MULTIPLE ELEMENTS

(71) Applicant: u-blox AG, Thalwil (CH)

(72) Inventor: Thomas Kaufmann, Thalwil (CH)

(73) Assignee: u-blox AG, Thalwil (CH)

( * ) Notice: Subject to any disclaimer, the term of this patent is extended or adjusted under 35 U.S.C. 154(b) by 253 days.

(21) Appl. No.: 17/722,659

(22) Filed: Apr. 18, 2022

(65) Prior Publication Data

US 2022/0368032 A1 Nov. 17, 2022

(30) Foreign Application Priority Data

May 14, 2021 (EP) .................................... 21173870

(51) Int. Cl.
*H01Q 21/22* (2006.01)
*H01Q 1/24* (2006.01)
*H01Q 21/00* (2006.01)
*H01Q 21/24* (2006.01)

(52) U.S. Cl.
CPC ............... *H01Q 21/22* (2013.01); *H01Q 1/24* (2013.01); *H01Q 21/0087* (2013.01); *H01Q 21/24* (2013.01)

(58) Field of Classification Search
CPC .... H01Q 21/22; H01Q 21/24; H01Q 21/0087; H01Q 1/24
See application file for complete search history.

(56) References Cited

U.S. PATENT DOCUMENTS 6,166,694 A * 12/2000 Ying .................... H01Q 9/0421 343/702
7,450,072 B2 * 11/2008 Kim ....................... H01Q 1/243 343/846
7,812,783 B2 * 10/2010 Mak ....................... H01Q 5/371 343/876
7,825,863 B2 * 11/2010 Martiskainen ........... H01Q 9/42 343/702
2013/0285857 A1 * 10/2013 Schultz .................... H01Q 9/42 343/700 MS
2013/0321240 A1 * 12/2013 O'Shea .................. H01Q 21/28 343/893
2014/0253393 A1 * 9/2014 Nissinen ............. H01Q 9/0421 343/702
2017/0179581 A1 * 6/2017 Puuri .................. H01Q 9/0421
2017/0324146 A1 11/2017 Karlsson
2020/0103833 A1 * 4/2020 Kita ...................... G04R 60/10

FOREIGN PATENT DOCUMENTS

CN 108172984 6/2018
EP 2846398 3/2015

OTHER PUBLICATIONS

EP Extended Search Report in European Appln. No. 21173870.3, dated Jan. 4, 2022, 9 pages.

* cited by examiner

*Primary Examiner* — Hai V Tran

(74) *Attorney, Agent, or Firm* — Fish & Richardson P.C.

(57) ABSTRACT

An antenna (100) comprising a plurality of like antenna elements (10) is disclosed. Each antenna element comprises: a radiating element (12, 13); a feed point (14); and a short to ground (16). The elements are spaced apart in different positions and oriented in different directions. Also provided are a GNSS receiver module (150) comprising the antenna, and a method of manufacturing the antenna. The antenna may be used, in particular, for receiving a circularly polarised signal.

18 Claims, 5 Drawing Sheets

ANTENNA COMPRISING MULTIPLE ELEMENTS

CROSS-REFERENCE TO RELATED APPLICATIONS

This application claims priority to European Application No. EP21173870.3, filed on May 14, 2021, the contents of which are incorporated herein by reference in their entirety.

FIELD OF THE INVENTION

The present invention relates to antennas. In particular, it relates to antennas suitable for a global navigation satellite system (GNSS) receiver.

BACKGROUND OF THE INVENTION

Antennas that are suitable for a global navigation satellite system (GNSS) receiver are known. A GNSS receiver receives satellite signals transmitted from a GNSS satellite constellation through such an antenna. Next-generation GNSS receivers operate at two (or more) frequency bands to mitigate multipath and atmospheric distortion errors. Hence, it is desirable for antennas to be compatible with dual-band GNSS technology.

In general, the cost and size of an antenna are important factors. It is desirable for the antenna to be as small as possible, and it is desirable for the antenna to be as economical as possible to manufacture on a large scale. Traditionally, reductions in antenna size have been achieved by increasing the dielectric constant of the substrate on which the antenna is fabricated. However, substrates with a high dielectric constant tend to be more expensive.

SUMMARY OF THE INVENTION

The present inventors have recognised that it would be desirable to provide a smaller antenna—for example, a smaller antenna for a GNSS receiver—without resorting to high cost, high dielectric constant materials.

The invention is defined by the claims. According to a first aspect, there is provided an antenna comprising a plurality of like antenna elements, each antenna element comprising:
- a radiating element;
- a feed point, for coupling the radiating element to a receiver or transmitter; and
- a short to ground, for galvanically connecting the radiating element to a ground plane, wherein the antenna elements are spaced apart in different positions and oriented in different directions.

Antennas according to embodiments may facilitate size reduction, and may be manufactured at relatively low cost, without the need for specialised, high dielectric constant materials.

The antenna elements are substantially similar, preferably identical. The antenna elements may be spaced and oriented with regular intervals between them, in a rotationally symmetric arrangement. This means that the set of antenna elements looks the same when rotated by a partial turn. The degree of rotational symmetry (that is, the number of distinct orientations in which the set of antenna elements looks the same) may be identical to the number of antenna elements.

There may be at least three antenna elements, or at least four antenna elements. Such configurations may be suitable for transmitting/receiving circularly polarised signals. In particular, they may facilitate reception of right-hand circularly polarised GNSS signals.

The radiating element and the short to ground are conductive elements.

The ground plane may be provided separately from the antenna—in particular, separately from the antenna elements. For example, the ground plane may be formed on a substrate that is different from a substrate on which any of the antenna elements is formed.

Antenna elements like those presently disclosed, having a radiating element, a feed point, and short to ground, are sometimes described as "inverted-F" antennas.

The antenna elements may be configured to transmit/receive different versions of the same signal, with a phase shift between the versions of the signal that are transmitted/received by neighbouring antenna elements.

In other words, the different versions of the same signal may be phase-shifted versions of the signal—copies of the same signal at different phase shifts. In this way, the antenna elements are configured to act as a single radiating element.

The antenna elements may be collectively configured to transmit/receive a circularly polarised signal.

The radiating element of each antenna element may extend in a plane parallel to the ground plane, and the short to ground may extend perpendicular to the ground plane.

Each radiating element may lie in a notional plane that is parallel to the ground plane. This means that each radiating element extends parallel to the ground plane, and is spaced a certain fixed distance from the ground plane. Each radiating element may describe a line or an arc in the notional plane.

Each short to ground may extend between the ground plane and the radiating element such that it is perpendicular to the ground plane and perpendicular to the notional plane in which the radiating element lies. In a normal upright orientation of the antenna, both the ground plane and this notional plane may be horizontal planes.

In each antenna element, the radiating element may comprise an elongate element and the feed point may be arranged at an intermediate point along the elongate element.

In each antenna element, the short to ground may be arranged at one end of the radiating element.

The antenna may be a multi-band antenna or dual band antenna.

A multi-band antenna is configured to have resonant frequencies in more than one frequency band. A dual band antenna is an example of a multi-band antenna, which is configured to have exactly two resonant frequencies, in respective different frequency bands.

The antenna may have a first resonant frequency in a first frequency band and a second resonant frequency in a second frequency band, different from the first frequency band. A ratio of the first resonant frequency to the second resonant frequency may be in the range 1.2:1 to 1.4:1, optionally 1.3:1 to 1.35:1. In some embodiments, the first resonant frequency may be in the L1 band and the second resonant frequency may be in the L5 band.

In each antenna element, the radiating element optionally comprises a first part and a second part, wherein the first part is spaced a first distance from the ground plane and the second part is spaced a second distance from the ground plane, wherein the second distance is greater than the first distance.

Providing the first part and second part in this way may offer one convenient way to achieve dual-band or multi-band functionality.

Each of the first part and the second part may comprise an elongate element, wherein the first part has a first length and the second part has a second length, different from the first length.

The second length may be longer than the first length.

Each elongate element may extend in a plane parallel to the ground plane. The first length and the second length may be measured parallel to the ground plane.

The feed point may be arranged at an intermediate point along the first part, and wherein the short to ground is arranged at one end of both the first part and the second part, for galvanically connecting the first part and the second part to the ground plane.

The length of each part may be measured (parallel to the ground plane) starting from the short to ground.

Each antenna element may be formed on a printed circuit board (PCB). In some embodiments, the antenna elements may all be formed on different PCBs.

The antenna elements may be formed on a single, unitary substrate.

Each antenna element may be formed on a printed circuit board (PCB). The antenna elements may all be formed on the same PCB.

The use of a PCB substrate may help to reduce cost and weight, especially in comparison with antennas that require a substrate with a high dielectric constant. Reduction in weight can help to make the antenna less susceptible to damage due to mechanical vibration and impacts.

The substrate may be flexible, and may be bent, curved or folded to arrange the antenna elements in their respective positions and orient them in their respective directions.

The substrate may be bent, curved or folded, such that an edge of the substrate, parallel to the ground plane, may form one of the following shapes: a circle; an ellipse; a polygon; a polygon with rounded corners; a rectangle; and a rectangle with rounded corners.

Here, it should be understood that a "rectangle" includes a square, as a special case in which the rectangle has sides of equal length. Alternatively, the rectangle may have sides of unequal length.

The substrate may comprise a flexible PCB.

The antenna may have a length and a width, or a diameter, in the range 25 to 30 mm, with the length and the width optionally being equal, and a height in the range 5 to 7 mm.

The antenna may further comprise a phase shifting network, coupled to the feed points of the antenna elements and configured to provide a phase shift between the feed points of neighbouring antenna elements.

The phase shifting network may be configured to apply a phase shift between the antenna elements such that the antenna is configured to transmit/receive circularly polarised signals, in particular, right-hand circularly polarised signals. The phase shifts may all be substantially equal to one another. The phase shifts may be chosen in correspondence with the number and angular positions of the antenna elements. For example, where the antenna comprises N antenna elements, arranged at intervals of 360°/N, the phase shifts may be equal to 360°/N. The phase shifting network may avoid the need for a hybrid coupler to couple the feed points to the transmitter/receiver. This may help to reduce the cost of the overall system.

In general, the phase shifting network may be provided separately from the antenna elements, or may be formed integrally with the antenna elements. However, the latter arrangement may facilitate a reduction in the number of separate components, and potentially a consequent reduction in the size and cost of the antenna.

The antenna elements may be formed on a single, unitary substrate and the phase shifting network may be formed on the same substrate as the antenna elements. This can provide a compact, efficient, and cost effective way to form the phase shifting network. As noted above, the substrate may comprise a PCB, in particular, a flexible PCB.

The phase shifting network may comprise one or more inductive or capacitive elements between each pair of neighbouring antenna elements. The use of one or more inductive/capacitive (L/C) elements in the phase shifting network can facilitate a size reduction of the phase shifting network, thereby making the overall system more compact.

Each antenna element may comprise one or more inductive or capacitive elements.

The one or more L/C elements in each antenna element may be configured to increase an electrical length of at least a portion of the antenna element. This can facilitate a reduction in the size of the antenna element (for a given frequency band of operation), and thereby a reduction in the size of the antenna, making it more compact. The one or more L/C elements can also assist in tuning at least one resonant frequency of the antenna.

At least one of the inductive or capacitive elements may be formed as a distributed element. This applies to the one or more L/C elements of the antenna elements and/or those of the phase shifting network. If the antenna elements are formed on a unitary substrate, the distributed element(s) may comprise conductive tracks on the substrate.

In alternative embodiments, the L/C elements may be formed as discrete elements—for example, surface mount elements on a PCB. However, distributed elements may have the advantage of lower cost.

Distributed elements formed on a flexible PCB can offer accurate control of fine dimensions of the elements, facilitating reduction in size as well as improved manufacturing yield.

Also provided is a GNSS receiver module, comprising: an antenna as summarised above and/or according to of any one of the appended claims; and a GNSS receiver, coupled to the antenna.

The antenna may be coupled to the GNSS receiver via one or more filters and/or amplifiers.

The GNSS receiver may be configured to receive signals in both the L1 and L5 bands, via the antenna.

According to another aspect, there is provided a method of manufacturing an antenna, the method comprising:

providing a flexible substrate;

disposing a plurality of like antenna elements on the flexible substrate, each antenna element comprising:

a radiating element, a feed point, for coupling the radiating element to a receiver or transmitter, and a short to ground, suitable for galvanically connecting the radiating element to a ground plane; and bending the flexible substrate such that the antenna elements are spaced apart in different positions and oriented in different directions.

The method may further comprise disposing a phase shifting network for the antenna on the flexible substrate. Optionally, this may be done in the same step as disposing the antenna elements on the substrate.

Also provided is a method of transmitting or receiving a circularly polarised signal using an antenna as summarised above or as recited in any one of the appended claims.

BRIEF DESCRIPTION OF THE DRAWINGS

The invention will now be described by way of example with reference to the accompanying drawings, in which.

Figure 1:
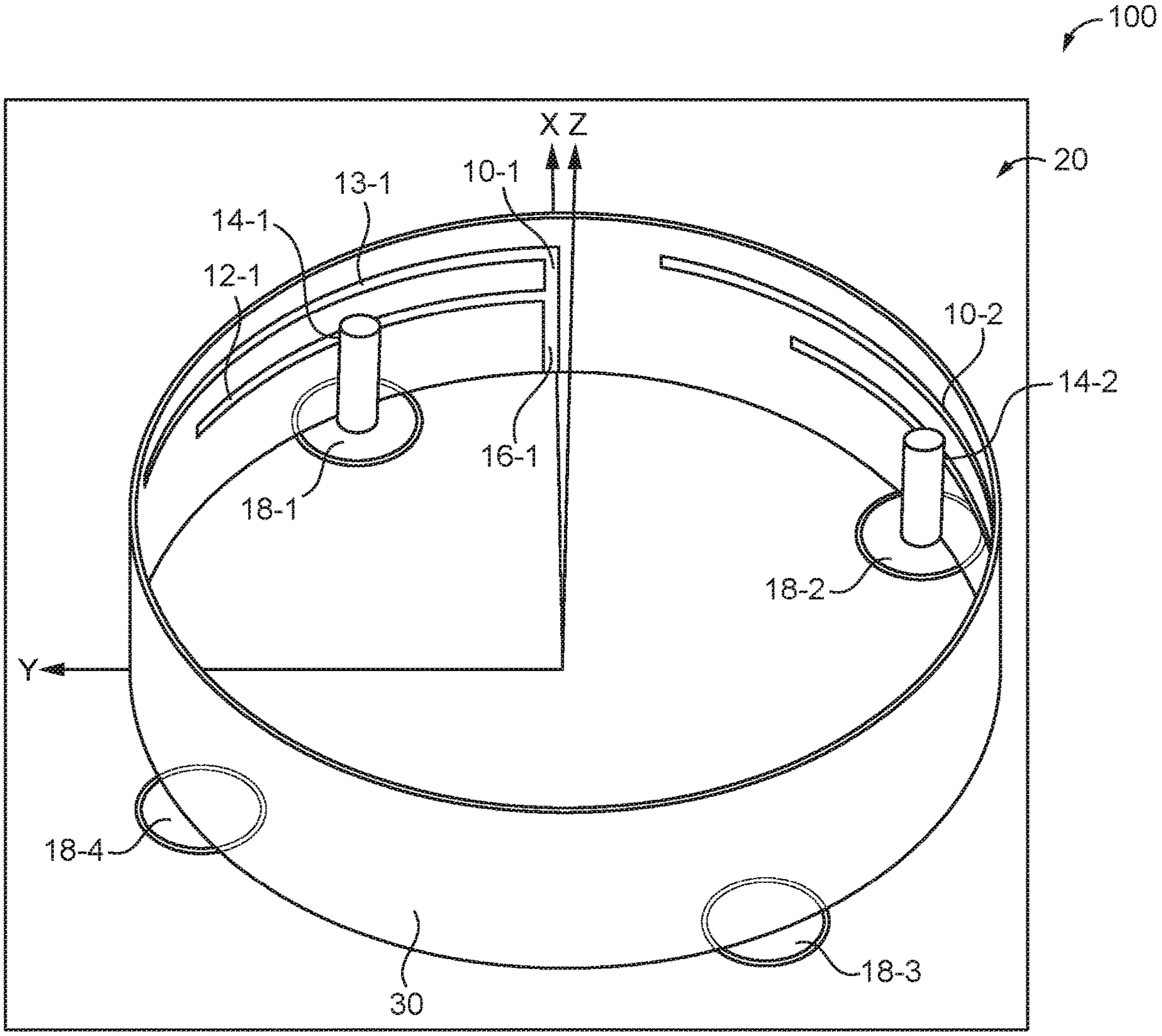
FIG. 1 is a schematic drawing of an antenna according to an example.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

Reference will now be made in detail to embodiments of the invention, examples of which are illustrated in the accompanying drawings. The described embodiments should not be construed as being limited to the descriptions given in this section; the embodiments may have different forms. In the embodiments below, an antenna comprising a plurality of like antenna elements, a GNSS receiver module incorporating the antenna, and a method of manufacturing such an antenna shall be described.

FIG. 1 is a schematic diagram of an antenna 100 according to an example. The antenna in this example is used as part of a GPS receiver module 150 (illustrated in FIG. 3), but the scope of the present disclosure is not limited to such an example. The antenna in this example is a dual-band antenna configured to receive signals from GPS satellites, with a first resonant frequency in the L5 band and a second resonant frequency in the L1 band. However, the antenna is not limited to such an example, and could be designed to receive signals from other GNSS constellations.

In the example shown in FIG. 1, the antenna 100 has four antenna elements 10. Only two of the antenna elements 10-1 and 10-2 are visible in the perspective drawing of FIG. 1; however, it should be understood that two other antenna elements are present but hidden in this view.

The antenna elements 10 are all identical. They are arranged in a circular configuration, at regular angular intervals of 90°. Consequently, the antenna is rotationally symmetric, with a degree of rotational symmetry equal to 4. This antenna is well-suited to transmitting—or, in particular, receiving—right-hand circularly polarised (RHCP) GPS signals. Designing the antenna to receive RHCP GPS signals using such a configuration of antenna elements may assist with rejection of reflected (multipath) GPS signals, and may improve the gain of the antenna.

The antenna elements 10 are formed on a unitary substrate. Specifically, in this example, the antenna elements 10 are formed by metallization on a flexible printed circuit board (PCB) 30. That is, the flexible PCB 30 is a unitary substrate on which the antenna elements 10 are formed. The height of the flexible PCB 30, and hence the height of the antenna 100 itself, is measured along the z-axis. This flexible PCB 30 is bent 360° around the z-axis into a cylindrical shell with open circular ends. The height of the antenna is less (preferably significantly less) than the diameter of the antenna, measured parallel to the x-y plane. For example, the antenna may have a height of approximately 5 mm and a diameter of approximately 25 mm.

In the example illustrated in FIG. 1, the PCB 30 is bent so that the antenna elements 10 are disposed on the inner surface of the cylindrical shell; however, in other examples, the PCB 30 could be bent in the opposite direction, such that the antenna elements would be disposed on the outer surface of the shell. A lower end of the cylindrical shell sits on a flat, horizontal ground plane 20, in a normal upright orientation of the antenna. An upper end of the cylindrical shell faces vertically upwards towards the sky, in this normal, upright orientation. This vertical upward direction is also referred to as the z-axis or positive z-direction. In the normal upright orientation of the antenna, the ground plane is parallel to the x-y plane. Each antenna element 10 comprises a feed point 14 which is aligned with a respective opening 18 in the ground plane, so that a feed pin (or other conductor carrying signals to or from the antenna) can extend vertically through the ground plane 20 to connect galvanically with the antenna element 10 at the feed point 14.

The ground plane 20 is provided on a separate flat substrate, which mechanically supports the flexible PCB 30 from below. The ground plane 20 is shown partially and schematically in FIG. 1. It is assumed to be much larger in area than the area of the cylindrical shell in the x-y plane, but its particular size and shape can be chosen according to the implementation—for example, according to the space available to mount the antenna. The presence of the ground plane 20, a conductive surface, shapes the near fields of the antenna 100, maintaining a zenith-facing radiation pattern and ensuring the antenna impedance is within the desired specifications.

It will be understood that the parts associated with different antenna elements are distinguished by the use of suffixes -1 to -4 in the reference numerals. Thus, a first antenna element 10-1 has a feed point 14-1 above an opening 18-1 in the ground plane 20, and so forth. Likewise, a second antenna element 10-2 is positioned above an opening 18-2 in the ground plane. As mentioned above, a third antenna element 10-3 and a fourth antenna element 10-4 are hidden from view in FIG. 1, because they are formed on the inner surface of the bent PCB 30. However, the openings 18-3 and 18-4 in the ground plane 20, for these third and fourth antenna elements, are visible in FIG. 1.

Since the antenna elements 10 are evenly distributed around the cylindrical shell, with regular angular shifts of 90° between them, the openings 18 in the ground plane are distributed in the same rotationally symmetric pattern.

Figure 3:
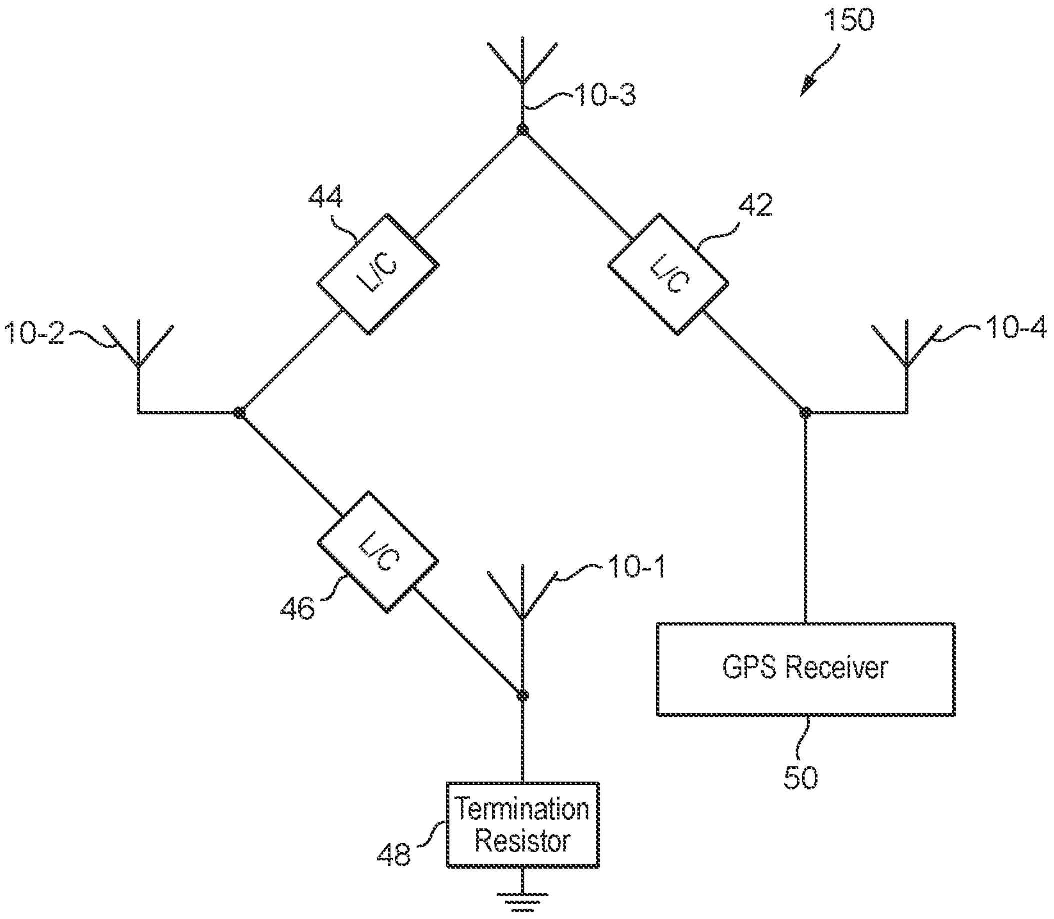
FIG. 3 is a schematic block diagram of a GPS receiver module incorporating the antenna of FIG. 1 or the antenna of FIG. 2.

Each antenna element 10 comprises a radiating element formed of parts 12 and 13, a feed point 14, and a short to ground 16. The feed point 14 is used to couple the radiating element 12, 13 to a GPS receiver 50 as part of the GPS receiver module 150. (The GPS receiver and GPS receiver module are illustrated in FIG. 3.) The short to ground 16 is used to galvanically connect the radiating element 12, 13 to the ground plane 20.

According to the example illustrated in FIG. 1, the antenna elements 10 are fed by connecting a feed pin to their feed points 14, through openings 18 in the ground plane 20. This can be achieved by providing coaxial connectors on the back (bottom) surface of the substrate carrying the ground plane 20. Each coaxial connector would couple to a feed pin extending through a respective opening 18 in the ground plane 20, to couple to the respective antenna element 10. However, the need for four coaxial connectors may make this example expensive to implement. It would be desirable to also have more cost-effective alternatives.

Figure 2:
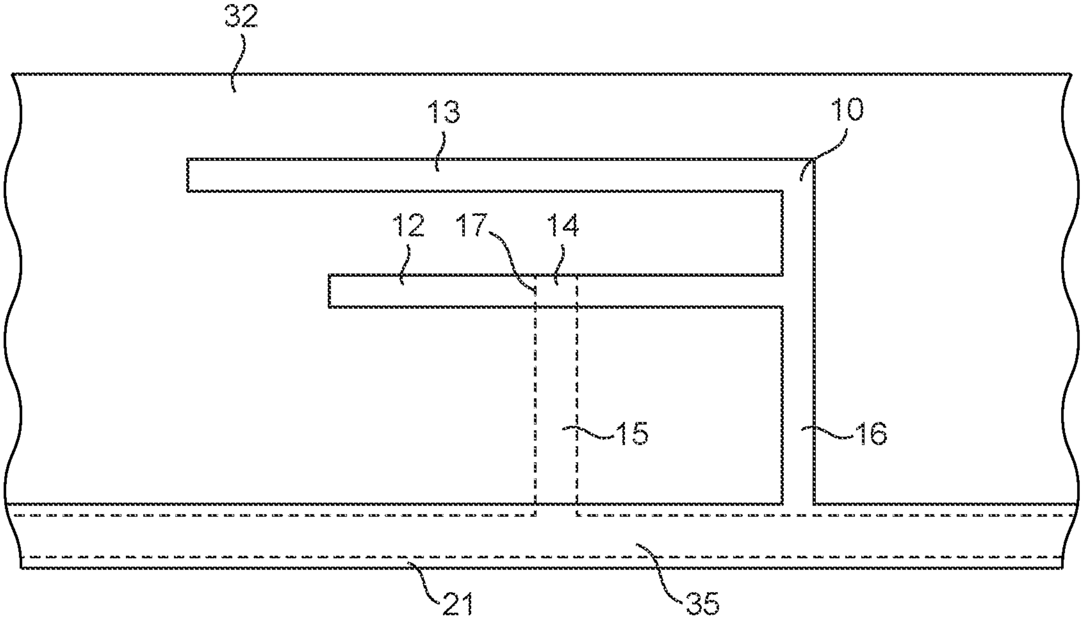
FIG. 2 is a schematic diagram showing one of a plurality of antenna elements of an antenna according to a second example.

FIG. 2 illustrates a portion of an antenna according to a second example. The antenna according to the second example is similar to the antenna 100 illustrated in FIG. 1. In particular, the antenna elements 10 are configured similarly, with a radiating element formed of parts 12 and 13, a feed point 14, and a short to ground 16. The antenna elements 10 are provided on a flexible PCB 32, which is bent into a cylindrical shape similarly to the flexible PCB 30 of FIG. 1. However, in this example, the antenna elements are fed differently, without the need for the feed pin. Instead, a micro-strip feed network is located on the outer surface of the bent PCB 32, while the antenna element 10 is located on the inner surface (as in FIG. 1). The micro-strip feed network comprises a transmission line 35, distributed L/C elements (not shown on FIG. 2) present on the transmission line 35 between the respective antenna elements 10, and feed lines 15 that couple the respective antenna element 10 to the transmission line 35. This avoids the need for the openings 18, which are therefore not present in the example of FIG. 2. Instead, the micro-strip feed network is connected to the feed point 14 of each antenna element through a respective via-hole 17 in the bent PCB 32. The feed lines 15 and the transmission line 35 are metallic micro-strips located on the outer surface of the bent PCB 32. In the embodiment shown in FIG. 2, each feed line 15 is galvanically connected to the respective antenna element 10, through the respective via-hole 17. In a variant of this embodiment, the feed line 15 may instead be coupled to the antenna element 10 by capacitive coupling, wherein the feed line 15 (on the outer surface of the flexible PCB 32) overlaps with part of the antenna element 10 (on the inner surface of the flexible PCB 32). This use of capacitive coupling can avoid the need for the via-holes 17.

The parts of each individual antenna element 10 will now be described in greater detail, with reference to FIG. 2. (However, it will be understood that much of the same description is also applicable to the antenna elements 10 of FIG. 1.) The schematic diagram of FIG. 2 shows a portion of the flexible PCB 32 in its flat configuration, prior to bending. Solid lines in FIG. 2 indicate the components of the antenna formed on the inner surface of the bent PCB 32, while dashed lines indicate the components of the antenna formed on the outer surface of the bent PCB 32. In an alternative configuration, this arrangement could be reversed. That is, the dashed lines could indicate the components on the inner surface of the bent PCB and solid lines could indicate the components on the outer surface of the bent PCB.

It can be seen that each antenna element 10 comprises a radiating element formed of parts 12 and 13, a feed point 14, and a short to ground 16. The feed point 14 is used to couple the radiating element 12, 13 to the GPS receiver 50 (illustrated in FIG. 3). The short to ground 16 is used to galvanically connect the radiating element 12, 13 to ground. The short to ground 16 is galvanically connected to ground via a ground strip 21, a metallic strip that is formed on the inner surface of the bent PCB 32. The ground strip 21 runs horizontally along the lower edge of the flexible PCB 32, with the lower edge of the flexible PCB aligned with the lower edge of the ground strip 21. The lower edge of the flexible PCB 32 sits on a horizontal ground plane 40 (not illustrated in FIG. 2), such that the lower edge of the ground strip 21 is galvanically connected to the ground plane 40. The presence of the ground plane 40 shapes the near field of the antenna, similarly to the ground plane 20 of FIG. 1.

As can be deduced from FIGS. 1-2, the radiating element 12, 13 comprises at least one elongate element, which extends parallel to the lower edge of the flexible PCB 30 or 32. This means that the at least one elongate element extends in a plane parallel to the ground plane 20 or 40, when the flexible PCB is bent into its finished cylindrical shape and positioned on the ground plane 20 or 40. The radiating element 12, 13 will form an arc-shape in this parallel plane, in the finished configuration of the antenna.

The short to ground 16 extends vertically downward from one end of the radiating element 12, 13, towards the lower edge of the flexible PCB 32, where, in the example of FIG. 2 it will contact the ground strip 21 on the inner surface of the bent PCB 32. In the example of FIG. 1, the short to ground extends all the way to the lower edge of the flexible PCB 30, where it contacts the ground plane 20.

The feed point 14 is arranged at an intermediate point along the radiating element 12, 13. This combination of features provides the antenna element 10 with an inverted-F configuration.

In the examples shown in FIGS. 1 and 2, the radiating element of each antenna element 10 comprises a first part 12 and a second part 13, each of which comprises an elongate element. The first part 12 is spaced at a first distance from the lower edge of the flexible PCB 30 or 32 (and is therefore spaced from the ground plane 20 or 40 by the first distance). The second part 13 is spaced at a second, larger distance from the lower edge of the flexible PCB 30 or 32 (and is therefore spaced from the ground plane 20 or 40 by the second distance). Both the first and second parts extend horizontally, parallel to the ground plane. The short to ground 16 is provided at one end of both parts 12 and 13. It therefore connects the two parts 12 and 13 together galvanically at this end, and connects them both galvanically to ground. The second part 13 is longer than the first part 12.

The feed point 14 is arranged at an intermediate position along an elongate element of the radiating element. In particular, in the example shown in FIGS. 1 and 2, the feed point is positioned at an intermediate position between the ends of the first part 12 of the radiating element. A feed pin (in the example of FIG. 1) or other conductor (such as the feed line 15 in FIG. 2) couples to the antenna element 10 at the feed point 14. The feed line 15 in FIG. 2 is galvanically connected to the transmission line 35, which connects the antenna elements 10 to the GPS receiver 50. The feed line 15 galvanically connects the first part 12 of the radiating element with the transmission line 35. As indicated already above, in the present example the feed line 15 is galvanically connected to the first part 12 through the via-hole 17. This could be achieved instead by capacitive coupling between the feed line 15 and the first part 12 of the radiating element (avoiding the need for the via-hole 17).

The transmission line 35 extends parallel to the x-y plane on the outer surface of the bent PCB 32. A first vertical gap exists between the lower edge of the flexible PCB 32 and a lower edge of the transmission line 35, such that the lower edge of the flexible PCB 32 is below the lower edge of the transmission line 35. The first vertical gap ensures the transmission line 35 is not in contact with the ground plane 40. A second vertical gap exists between an upper edge of the transmission line 35 and an upper edge of the ground strip 21, such that the upper edge of the transmission line 35 is below the upper edge of the ground strip 21. The second vertical gap ensures that the transmission line avoids crossing over the short to ground 16, to avoid adding an undesired and/or unknown loading to the transmission line 35. Such an undesired/unknown loading may cause the performance of the micro-strip feed network to deteriorate.

Forming the radiating element of two parts 12 and 13 having different dimensions and arranged at different distances from the ground plane 20 or 40, as illustrated in FIGS. 1 and 2, can offer one convenient way to provide the antenna element 10 (and therefore the overall antenna) with multiple resonant frequencies. The smaller first part 12 may be configured to resonate at a higher resonant frequency than the larger second part 13. Nevertheless, the specific configuration of the antenna elements 10 that is shown in FIG. 1 and FIG. 2 is just one possible way to obtain dual-band functionality. Antenna elements with other shapes and configurations could alternatively be used. In general, a multi-band antenna according to the present disclosure may be achieved by providing a plurality of multi-band antenna elements, in which each antenna element 10 has multiple resonant frequencies. Since the antenna elements are identical, the resonant frequencies of every antenna element 10 are the same.

In the examples of FIGS. 1 and 2, the first part 12 of the radiating element facilitates operation of the antenna in the L1 band, while the second part 13 of the radiating element facilitates operation in the L5 band.

FIG. 3 is a schematic block diagram, showing the antenna coupled to a GNSS receiver, as part of a GNSS receiver module. For the antenna 100 in this example, configured to receive signals from GPS satellites, the antenna 100 is coupled to a GPS receiver 50, as part of a GPS receiver module 150. However, the antenna is not limited to such an example, and could be designed to receive signals from other GNSS constellations for GNSS receivers of other types. Not shown in FIG. 1 (and not shown in its entirety in FIG. 2), but illustrated schematically in the block diagram of FIG. 3, is a phase shifting network comprising L/C phase shifting circuits 42, 44, 46 between neighbouring feed points 14. This phase shifting network provides the desired phase relationship between the various antenna elements 10, such that the antenna is configured to receive (or transmit) RHCP GPS signals. As shown in FIG. 3, the GPS receiver 50 is coupled to the feed point on the fourth antenna element 10-4. The feed point of the fourth antenna element 10-4 is coupled to the feed point of the third antenna element 10-3 via an L/C phase shifting circuit 42. This provides a phase shift of approximately 90° over the frequency range of interest (that is, over both of the two frequency bands at which the antenna is configured to operate). The feed point of the third antenna element 10-3 is coupled to the feed point of the second antenna element 10-2 via a similar phase shifting circuit 44, which provides another phase shift of approximately 90°. Likewise, the feed point of the second antenna element is coupled to the feed point of the first antenna element 10-1 via a further similar phase shifting circuit 46, which provides yet another phase shift of approximately 90°. The cumulative effect of these successive phase shifts is that there is a phase shift of approximately −90° between the fourth antenna element 10-4 and the first antenna element 10-1. The clockwise configuration of the antenna elements 10 helps the antenna to receive (or transmit) RHCP GPS signals. A termination resistor 48 is connected to the first antenna element 10-1, at the end of the phase shifting network, to terminate the phase shifting network to ground. The resistance value of the termination resistor is selected for proper termination of the network, depending on the antenna impedance and the characteristic impedance of the transmission line. Thus, proper impedance matching is ensured, reducing the likelihood of the GPS signals reflecting or distorting, which may result in destructive interference and power loss.

In the example illustrated in FIG. 1, although not shown, it is assumed that the phase shifting network is provided separately from the antenna elements 10 on the flexible PCB 30. Hence, a feed pin is shown extending through the ground plane 20 to each feed point 14 of each antenna element 10. The phase shifting network, comprising phase shifting circuits 42, 44, 46, is provided by L/C elements connected between these pins.

In the second example illustrated in FIG. 2, the phase shifting network is integrated into the flexible PCB 32. In this example, the phase-shifting network is provided by the micro-strip feed network discussed previously above, comprising feed lines 15, the transmission line 35, and distributed L/C elements present on the transmission line 35. The L/C elements of the micro-strip feed network are conveniently formed as distributed elements, by metallisation on the flexible PCB 32. The transmission line 35 is populated with L/C elements between neighbouring feed points 14 to provide the desired phase relationship between the various antenna elements 10. For example, if the antenna element illustrated in FIG. 2 is the third antenna element 10-3, according to the phase shifting network illustrated in FIG. 3, distributed L/C elements would be present on the transmission line 35 coupling the feed points 14-3 and 14-4, to form L/C phase shifting circuit 42. Correspondingly, distributed L/C elements would be present on the transmission line coupling the feed points 14-3 and 14-2, to form L/C phase shifting circuit 44. The capacitive elements are formed by adjacent, non-contacting tracks of metallisation on the flexible PCB 32. The inductive elements are formed by convoluted tracks of metallisation. Such tracks can be formed precisely using known PCB manufacturing technology, allowing good control over the characteristics of the micro-strip feed network. This approach also allows the micro-strip feed network to be formed in the same process steps as the antenna elements 10, which may help to reduce the cost of manufacture of the antenna. The construction of the micro-strip feed network using distributed L/C elements may avoid the need for hybrid couplers—components that can significantly increase the production cost of a GNSS receiver module.

In another example, the phase shifting network may comprise a single feed pin extending to the feed point of the fourth antenna element 10-4, to couple the GPS receiver 50 to this element. The feed points of the first, second, and third antenna elements 10-1, 10-2, and 10-3 may be coupled to the feed point of the fourth antenna element 10-4 by successive phase shifting circuits 46, 44, and 42, implemented on the flexible PCB itself.

The exemplary phase shifting network illustrated in FIG. 3 matches the configuration of the exemplary antenna 100 shown in FIG. 1, having four antenna elements. Because the antenna elements 10 are spaced physically at angles of 90°, a phase shift of approximately 90° is provided between each adjacent pair of antenna elements 10. It should be understood that, in other examples, the number of antenna elements may be greater or less than four (although it is preferably at least three in order to support RHCP signals). The phase shifts provided by the phase shifting network should then be adapted accordingly. For example, if there are three antenna elements, they may have physical angular spacings of 120°, and there may be two phase shifting circuits, each of which provides a phase shift of approximately 120° in the frequency range of interest.

Note that, since the phase shift of an L/C phase shifting circuit will inevitably be a variable function of frequency, it is not possible, in practice, to provide a phase shift of exactly 90° uniformly over the entire frequency range. However, it has been found that reception of RHCP signals may be enhanced by providing approximately the correct phase shifts over the relevant frequency range—for example, by providing that the average phase shift over the frequency range has the targeted value.

In some examples, distributed L/C elements may also be provided in the antenna elements 10. Here, they may be used to change the electrical length of one or more portions of the antenna element. This may help to reduce the size of the antenna element (and potentially also the antenna) for a given desired frequency range of operation. The L/C elements can also be used as part of the antenna elements in order to tune one or more resonant frequencies of the antenna.

Figure 4:
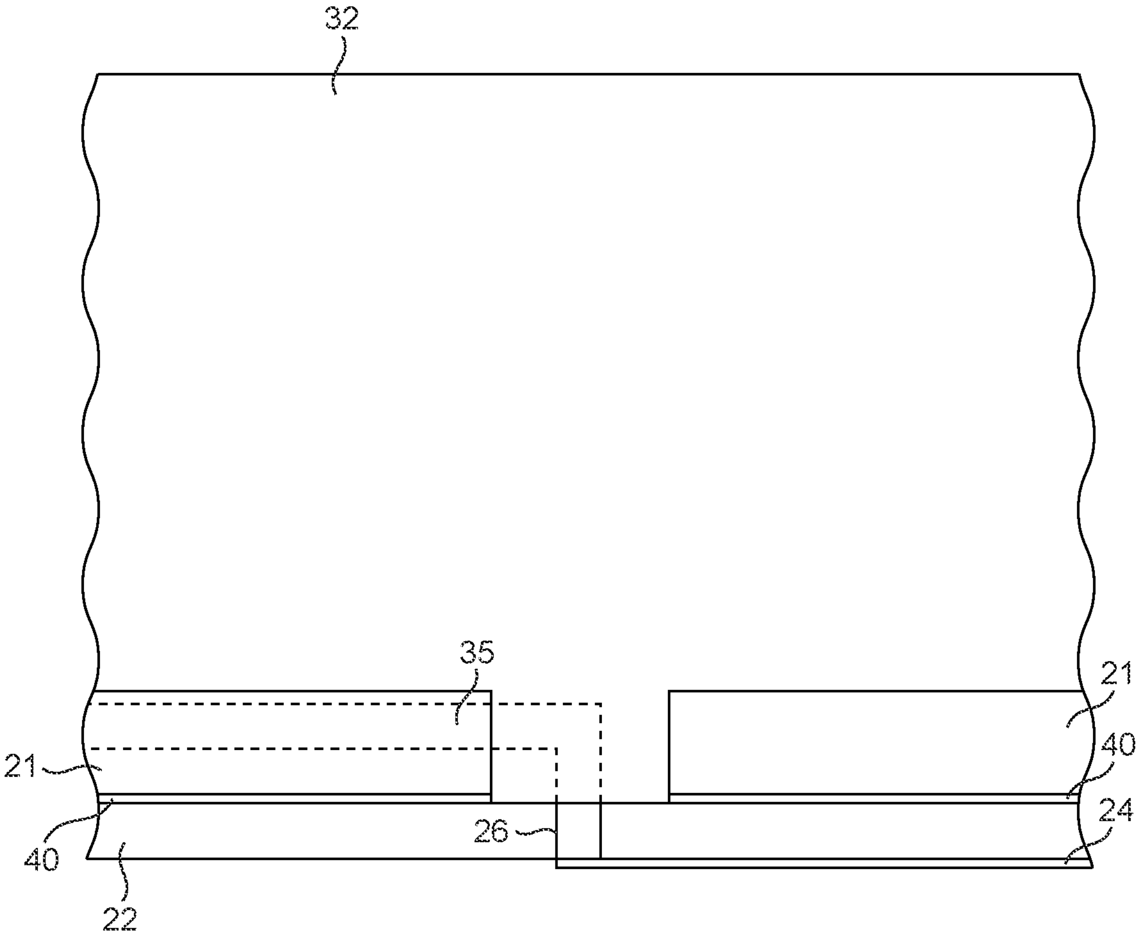
FIG. 4 is a schematic diagram illustrating a section of a micro-strip feed network of the antenna according to the second example.

FIG. 4 illustrates a feed of the antenna according to the second example. A horizontal host board 22 lies parallel to the x-y plane. In this example, the host board is a rigid PCB. The horizontal ground plane 40 is formed on an upper surface of the horizontal host board 22. The flexible PCB 32 (a portion of which is illustrated in FIG. 2) is positioned on an exposed upper surface of the ground plane 40. The feed of the antenna according to the second example is a 50 Ohm trace 24 that electrically connects the antenna to the GPS receiver 50. The 50 Ohm trace is formed on a lower surface of the horizontal host board 22, such that the ground plane 40 of the antenna and the 50 Ohm trace 24 are formed on opposite sides of the horizontal host board 22. The 50 Ohm trace is electrically connected to the transmission line 35 through a via hole 26 in the host board 22, lined with a conductive material. The trace 24 has an impedance that matches the characteristic impedance of the micro-strip feed network (including transmission line 35, feed lines 15, and distributed L/C elements present on the transmission line 35) together with the antenna elements 10, in order to achieve optimal power transfer.

Figure 5:
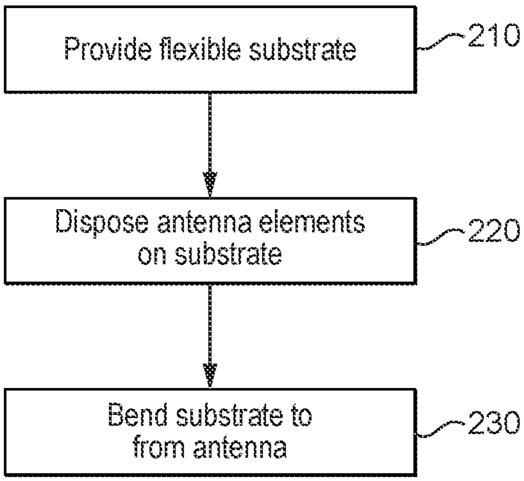
FIG. 5 is a flowchart illustrating a method of manufacturing an antenna, according to an example.

FIG. 5 illustrates a method of manufacturing an antenna, according to one example. The method begins with the step 210 of providing a flexible substrate—namely, flexible PCB 30 or 32. In step 220, the plurality of antenna elements are disposed on the flexible PCB 30 or 32. This can be done using known processing techniques for PCB fabrication. As explained above, each antenna element comprises: a radiating element 12, 13; a feed point 14; and a short to ground 16. If the phase shifting network, comprising phase shifting circuits 42, 44, 46, is to be provided integrally on the flexible PCB 30 or 32, the phase shifting network may be formed in the same process step (or steps) as the antenna elements. After the desired elements have been formed on the flexible PCB 30 or 32, the method proceeds to step 230. In this step, the flexible PCB 30 or 32 is bent into the desired shape to form the antenna. In examples like the one shown in FIG. 1, this may comprise bending the flexible PCB 30 or 32 into a cylindrical shell with circular open ends.

It should be noted that the above-mentioned embodiments illustrate rather than limit the invention, and that those skilled in the art will be able to design many alternative embodiments without departing from the scope of the appended claims.

The antennas in FIGS. 1 and 2, used as part of the GPS receiver module 150 illustrated in FIG. 3, are configured to receive GPS signals with a first resonant frequency in the L5 band and a second resonant frequency in the L1 band. However, it should be understood that the same antennas will generally also be able to receive signals from GNSS satellites other than GPS satellites, including but not limited to Galileo satellites or BeiDou navigation satellite system (BDS) satellites. In particular, an embodiment designed for receiving GPS L1 and L5 signals will typically also be able to receive Galileo E1 and E5 signals, and similarly it will typically also be able to receive BeiDou B1C and B2a signals. Other embodiments may be designed for receiving signals from other (existing or future) GNSS constellations.

Antennas according to some embodiments may receive GPS signals but may have a first and second resonant frequency different to the resonant frequencies stated above. For example, the antenna may have a first resonant frequency in the L2 band, and a second resonant frequency in the L1 band. More generally, for an antenna designed to receive GNSS signals, the ratio of the first resonant frequency to the second resonant frequency may be in the range 1.2:1 to 1.4:1, optionally 1.3:1 to 1.35:1.

In general, a GNSS receiver module according to the present disclosure comprises an antenna according to the present disclosure and a GNSS receiver. The GNSS receiver module further comprises a phase shifting network for the antenna. The phase shifting network may be formed integrally with, or separately from, the antenna.

It should be understood that, although in the examples above the antenna was a GNSS antenna, antennas according to the present disclosure may be used for other applications/purposes.

In the example of FIG. 1, the flexible PCB 30 was bent into a cylindrical shell. The same was true for the flexible PCB 32 of the second example. It should be understood that this is not the only possible configuration for the antenna. For example, the antenna could be bent into a shape such that an upper end and a lower end of the flexible PCB resemble a square with rounded corners. This would still provide the desired angular spacing between the different antenna elements. Similarly, for examples in which the antenna comprises a different number of antenna elements, the flexible substrate could be bent into other shapes with upper and lower ends that form approximately polygonal shapes with rounded corners. Various other geometric shapes are of course also possible. Note that the geometric shape need not be complete, in some examples. For instance, there may be a gap between the first and last antenna element, where the first antenna element is formed at one edge of a flexible substrate and the last antenna element is formed at the opposite edge of the flexible substrate. This should not interfere with the correct positioning of the antenna elements with the correct angular spacing.

Of course, in still other examples of antennas according to the present disclosure, the antenna elements need not be formed on a single unitary flexible substrate. Although potentially convenient, it is not essential that all of the antenna elements are formed on a single unitary substrate that is folded or bent into shape. In some examples, the different antenna elements of the antenna could be provided on separate substrates—for example, separate pieces of rigid PCB.

Although the phase shifting network described above may offer a convenient and economical way to provide the desired phase shifts between the respective adjacent antenna elements, equivalent results may be achieved in other ways. For instance, the phase shifting network could be replaced by a hybrid coupler in some examples.

Similarly, although the foregoing description has focused on examples in which L/C elements were formed as distributed elements, some or all of the L/C elements could be replaced by discrete elements, for example surface mount elements.

The phase shifting network is not limited to the configuration illustrated in FIG. 3. In particular, an alternative to the termination resistor 48 may be used to terminate the phase shifting network. For example, the termination resistor 48 may be replaced by a stub, added to tailor the phases along the phase shifting network and the stub, such that the combination of the GPS signals and their reflections results in constructive interference. The stub terminates the phase shifting network, ensuring the superimposing to GPS signals do not cause destructive interference.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is generally a highly automated process. Complex and powerful software tools are available for converting a logic level design into a semiconductor circuit design ready to be etched and formed on a semiconductor substrate.

The invention claimed is:

1. An antenna comprising a plurality of antenna elements, each antenna element comprising:

a first radiating element associated with a first frequency band and a second radiating element associated with a second frequency band;

a feed point coupling the first radiating element and the second radiating element in series to a receiver or transmitter; and a short to ground, wherein the short to ground galvanically connects the first radiating element and the second radiating element to a ground plane, wherein the antenna elements are spaced apart in different positions and oriented in different directions.

2. The antenna of claim 1, wherein the antenna elements are configured to transmit or receive different versions of the same signal, with a phase shift between the versions of the signal that are transmitted or received by neighbouring antenna elements.

3. The antenna of claim 1, wherein the antenna elements are collectively configured to transmit or receive a circularly polarised signal.

4. The antenna of claim 1, wherein the radiating element of each antenna element extends in a plane parallel to the ground plane, and wherein the short to ground extends perpendicular to the ground plane.

5. The antenna of claim 1 wherein, in each antenna element, the radiating element comprises an elongate element, and the feed point is arranged at an intermediate point along the elongate element.

6. The antenna of claim 1 wherein, in each antenna element, the short to ground is arranged at one end of the radiating element.

7. The antenna of claim 1, wherein the antenna is a multi-band antenna or dual band antenna.

8. The antenna of claim 1, wherein the antenna elements are formed on a single, unitary substrate.

9. The antenna of claim 8, wherein the substrate is flexible, and is bent, curved or folded to arrange the antenna elements in their respective positions and orient them in their respective directions.

10. The antenna of claim 1, further comprising a phase shifting network, coupled to the feed points of the antenna elements and configured to provide a phase shift between the feed points of neighbouring antenna elements.

11. The antenna of claim 10, wherein the antenna elements are formed on a single, unitary substrate and wherein the phase shifting network is formed on the same substrate as the antenna elements.

12. The antenna of claim 10, wherein the phase shifting network comprises one or more inductive or capacitive elements between each pair of neighbouring antenna elements.

13. The antenna of claim 12, wherein at least one of the inductive or capacitive elements is formed as a distributed element.

14. The antenna of claim 1, wherein each antenna element comprises one or more inductive or capacitive elements.

15. A method of manufacturing an antenna, the method comprising:

providing a flexible substrate;

disposing a plurality of antenna elements on the flexible substrate, each antenna element comprising:

a first radiating element associated with a first frequency band and a second radiating element associated with a second frequency band;

a feed point coupling the first radiating element and the second radiating element in series to a receiver or transmitter; and a short to ground, wherein the short to ground galvanically connects the first radiating element and the second radiating element to a ground plane; and bending the flexible substrate such that the antenna elements are spaced apart in different positions and oriented in different directions.

16. The method of claim 15, wherein the radiating element of each antenna element extends in a plane parallel to the ground plane, and wherein the short to ground extends perpendicular to the ground plane.

17. The method of claim 15, wherein, in each antenna element, the radiating element comprises an elongate element, and the feed point is arranged at an intermediate point along the elongate element.

18. The method of claim 15, wherein, in each antenna element, the short to ground is arranged at one end of the radiating element.

* * * * *